United States Patent
Huang et al.

(10) Patent No.: US 9,927,288 B2
(45) Date of Patent: Mar. 27, 2018

(54) REAL-TIME LIGHTING CONTROL SYSTEM AND REAL-TIME LIGHTING CONTROL METHOD

(71) Applicant: Chicony Power Technology Co., Ltd., New Taipei (TW)

(72) Inventors: Chao-Sheng Huang, New Taipei (TW); Kuo-Wei Lee, New Taipei (TW); Wei-Che Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/390,981

(22) Filed: Dec. 27, 2016

(65) Prior Publication Data
US 2017/0196070 A1    Jul. 6, 2017

Related U.S. Application Data

(60) Provisional application No. 62/273,537, filed on Dec. 31, 2015.

(51) Int. Cl.
| | |
|---|---|
| *H05B 37/02* | (2006.01) |
| *G01J 1/02* | (2006.01) |
| *G01J 1/04* | (2006.01) |
| *G01J 1/42* | (2006.01) |

(52) U.S. Cl.
CPC .......... *G01J 1/0266* (2013.01); *G01J 1/0271* (2013.01); *G01J 1/0437* (2013.01); *G01J 1/4228* (2013.01); *H05B 37/0227* (2013.01); *H05B 37/0272* (2013.01)

(58) Field of Classification Search
CPC ............ H05B 37/0227; H05B 37/0272; G01J 1/0266; G01J 1/0271; G01J 1/0437
USPC ......................................................... 315/297
See application file for complete search history.

(56) References Cited

U.S. PATENT DOCUMENTS

| | | | |
|---|---|---|---|
| 6,548,967 B1 * | 4/2003 | Dowling ............ | G06Q 30/0201 315/307 |
| 2009/0051624 A1 * | 2/2009 | Finney ............... | H05B 37/0245 345/30 |
| 2012/0310703 A1 * | 12/2012 | Cavalcanti ......... | G06Q 30/0201 705/7.29 |
| 2013/0141909 A1 * | 6/2013 | Ashdown ........... | G02B 19/0066 362/240 |

(Continued)

*Primary Examiner* — Don Le
(74) *Attorney, Agent, or Firm* — Chun-Ming Shih; HDLS IPR Services

(57) ABSTRACT

A real-time lighting control system of an ecosystem and real-time lighting control method includes a computer device, multiple lighting devices and multiple wireless base stations. The lighting devices and the wireless base stations are arranged in multiple lighting regions of an indoor space. Each wireless base station emits a wireless signal continuously, and controls one or more connected lighting devices when receiving a lighting control signal. The computer device senses the wireless signals continuously, and keeps determining its position at the different time points according to the received wireless signals and the arranged positions of the wireless base stations. Next, the computer selects one of the lighting regions according to space information and the determined positions, and sends the lighting control signal to one of the wireless base stations arranged in the selected lighting region.

18 Claims, 15 Drawing Sheets

(56) References Cited

U.S. PATENT DOCUMENTS

2013/0293118 A1\* 11/2013 Nagashima ........ H05B 37/0272
　　　　　　　　　　　　　　　　　　　　　315/155

\* cited by examiner

etc.), and connect to the cloud via the gateway device. There are the servers in the cloud, and the servers have various software service program, to analyze, store and feedback the various data from the gateway device.

REAL-TIME LIGHTING CONTROL SYSTEM AND REAL-TIME LIGHTING CONTROL METHOD

CROSS-REFERENCE TO RELATED APPLICATION

This patent application claims the benefit of U.S. Provisional Patent Application No. 62/273,537, filed Dec. 31, 2015, which is incorporated by reference herein.

BACKGROUND OF THE INVENTION

Field of the Invention

The technical field relates to lighting control and more particularly related to real-time lighting control system and real-time lighting control method.

Description of Related Art

The means of lighting control of the related art is to arrange a passive infrared (PIR) sensor at an entrance of a building and make the PIR sensor connect to all the lighting devices.

Above-mentioned PIR sensor will trigger a trigger signal to all the lighting devices for automatically controlling all the lighting devices to be turned on a pre-default time (such as 30 seconds) continuously when detecting that a user enters.

The lighting control means of the related art has following disadvantages of: the lighting control means of the related art has no ability of controlling the lighting device to be turned on continuously for providing lighting and making the user inconvenient when the user is still in situ because the PIR sensor can only detect a moving object; and, the lighting control means of the related art only has ability of controlling all the lighting devices to be turned on simultaneously, having no ability of controlling only part of the lighting devices to be turned on dynamically according to the user's position and thus resulting in waste of electricity.

SUMMARY OF THE INVENTION

Ecosystem is a general designation of a specific environment and all the interacting creatures in this environment. The abiotic factors (such as air, water and earth . . . etc.) of the specific environment interact continuously exchange the materials, and transfer the energy to the creatures in this specific environment; via the connection of the materials flow and the energy flow, they become a group, which is called as the ecosystem.

We named this system as the ecosystem of wireless smart sensing and controlling. Various types of wireless modules, for example: the light sensor, the infrared ray sensor, the temperature and humidity sensor, the gas sensor, the thermal array sensor, the relay, the analog input module (AI, such as the seismograph), the digital input (DI, such as the anisotropic magnetoresistance (AMR)), the wired to wireless module (such as the serial port data conversion module), the analog output module (AO, such as the valve), the digital output (DO, such as the switch) and the smart button, are like the creatures. They can connect to each other via the wireless network, and exchange the physical data of the space (such as the light, the sunshine intensity, the infrared ray, the ultrasound, the radio, the microwave, the temperature, the humidity, the gas, the image, the thermal induction, the water level, the pressure, the position, the electricity, the flow (water/gas), the acceleration, the gravity, the sound (decibel), the static electricity, the liquid level, and the non-contact induction . . . etc.), and connect to the cloud via the gateway device. There are the servers in the cloud, and the servers have various software service program, to analyze, store and feedback the various data from the gateway device.

In the ecosystem of wireless smart sensing and controlling, there are several different network systems, such as Wi-Fi, 3G, LTE, Bluetooth, and ZigBee . . . etc., each network system can communicate to each other and work with each other to allow the whole ecosystem of wireless smart sensing and controlling to be able to work in a heterogeneous network system and be compatible for the device of various network structure.

According to the different application, the ecosystem of wireless smart sensing and controlling can work with the different systems, such as the city security, the building managing system, the road and traffic management system, the environment and air quality monitoring system, the dam and agricultural automation system, and the smart building, to achieve the object of increasing the efficiency, energy saving and intellectualization.

The object of the present disclosed examples is to provide a real-time lighting control system and a real-time lighting control method in the ecosystem of wireless smart sensing and controlling which have ability of controlling the lighting devices located near the user according to the user's position.

One of the disclosed examples, a real-time lighting control system, comprises:

a plurality of lighting devices arranged in a plurality of lighting regions respectively in an indoor space;

a plurality of wireless base stations arranged in the lighting regions respectively, each wireless base station being connected to the corresponding lighting device arranged in the corresponding lighting region, sending a wireless signal continuously, and controlling the connected lighting device when receiving a lighting control signal; and a computer device comprising:

a positioning module continuously sensing the wireless signals and determining a plurality of positioning positions corresponding to different time points according to the wireless signals and a plurality of arranged positions of the wireless base stations; and a calculating module connected to the positioning module and selecting one of the lighting regions according to space information and the determined positioning positions, and sending the lighting control signal to the wireless base station arranged in the selected lighting region, wherein the space information records distributing information of the lighting regions in the indoor space.

One of the disclosed examples, a real-time lighting control method applying to a real-time lighting control system, the real-time lighting control system comprises a plurality of lighting devices arranged in a plurality of lighting regions in an indoor space, a plurality of wireless base stations arranged in the lighting regions and a computer device, the real-time lighting control method comprises:

a) the computer device sensing a plurality of wireless signals sent from the wireless base stations continuously;

b) determining a plurality of positioning positions corresponding to the different time points according to the wireless signals and a plurality of arranged positions of the wireless base stations;

c) selecting one of the lighting regions according to a space information and the determined positioning positions, wherein the space information records a distributing information of the lighting regions in the indoor space; and d) sending a lighting control signal to the wireless base station arranged in the selected lighting region for controlling the lighting device connected to the wireless base station.

The present disclosed examples can effectively provide the lighting according to the user's position and prevent from a waste of electricity.

BRIEF DESCRIPTION OF DRAWING

The features of the present disclosed examples believed to be novel are set forth with particularity in the appended claims. The present disclosed examples itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed examples are described thereinafter according to a preferable embodiment, being not used to limit its executing scope. Any equivalent variation and modification made according to appended claims is all covered by the claims claimed by the present disclosed examples.

Figure 1A:
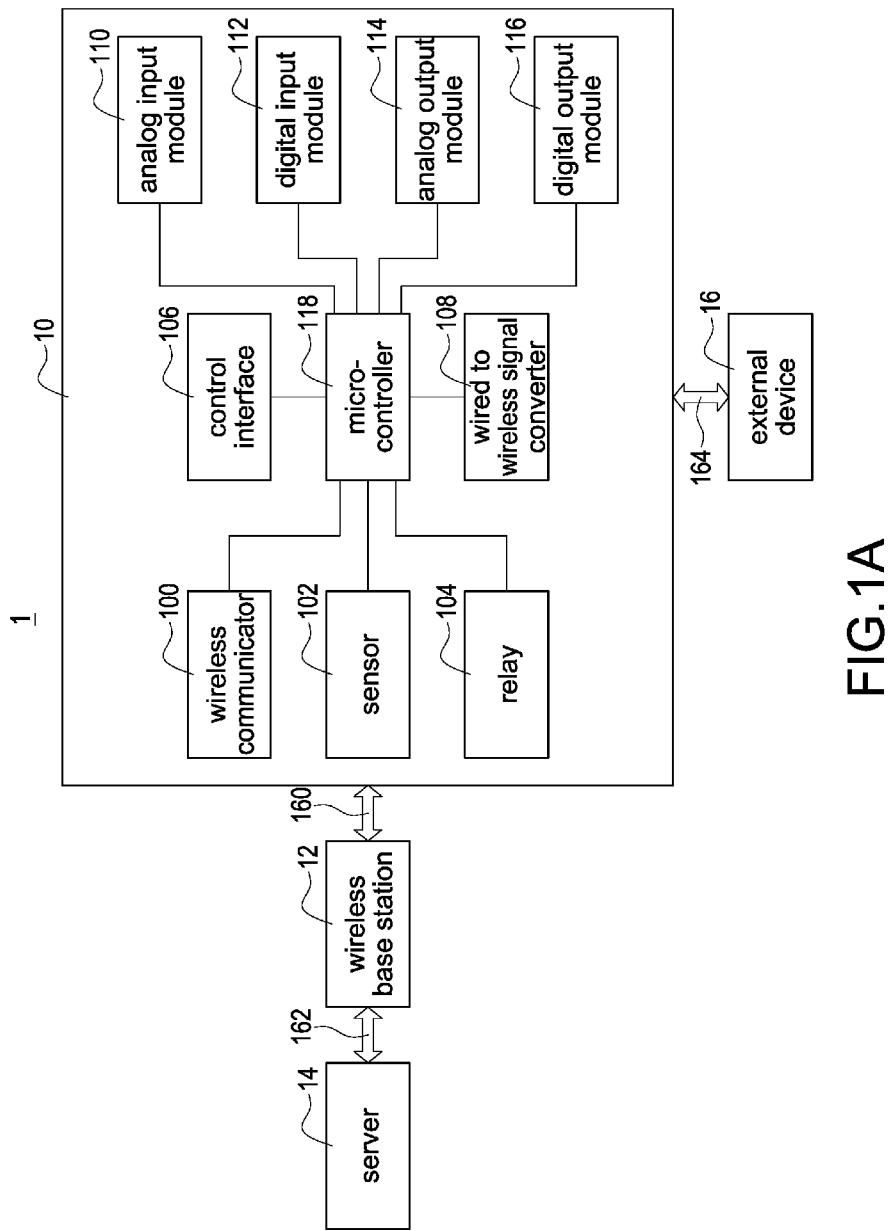
FIG. 1A is an architecture diagram of an ecosystem of wireless smart sensing and controlling according to one embodiment of the present disclosed examples.
Figure 1B:
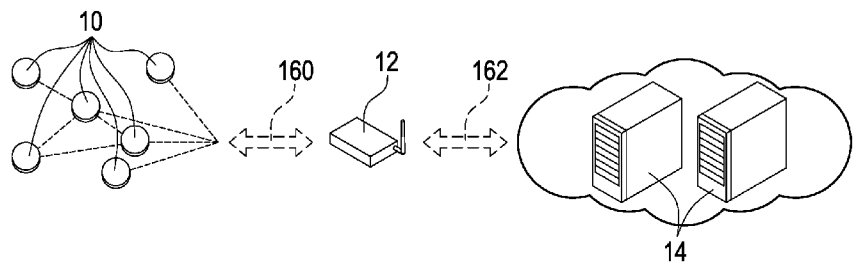
FIG. 1B is an environment architecture diagram of an ecosystem of wireless smart sensing and controlling according to one embodiment of the present disclosed examples.

Please refer to FIG. 1A and FIG. 1B simultaneously, FIG. 1A illustrates an architecture diagram of an ecosystem of wireless smart sensing and controlling according to one embodiment of the present disclosed example, FIG. 1B illustrates an environment architecture diagram of an ecosystem of wireless smart sensing and controlling according to one embodiment of the present disclosed examples.

The ecosystem of wireless smart sensing and controlling 1 of this embodiment (wireless sensing system 1 as abbreviation) comprises one or more wireless device 10, one or more wireless base station 12 (such as gateway) and one or more server 14 (such as group of servers or cluster). The wireless 10 is wirelessly connected to the wireless base station 12 via a first network 160, and the wireless base station 12 is connected to the server 14 via a second network 162. The amount of the wireless devices is based on the size of the space, the requirement or the environment condition (such as the different floors or decoration).

Furthermore, all or parts of the wireless device(s) 10 can be connected to one or more external device 16 (such as lamp, appliance or door-lock) and control the connected external device 16.

In one embodiment, the first network 160 can be Zig-bee, Z-wave, Bluetooth Low Energy (BLE) or the other low energy wireless network, the second network 162 can be the internet, mobile network (such as 3G (WCDMA) network or 4G (LTE-A) network) or Wi-Fi. The third network can be anyone of above-mentioned wired/wireless network.

In one embodiment, the wireless device 10 can communicate with each other via the first network 160, namely, each wireless device 10 is like a node of a wireless sensing network.

The wireless sensing system 1 can further comprises a management program (not shown in the figures), the management program can be installed in the gateway, server and/or the computer device (not shown in the figures) connected to above-mentioned device. The management program can operate a configuration program and a web interface of this configuration space after being executed. The web interface is used to receive an operation from a user and output the information. The configuration program can execute following process according to the operation of the user after being executed: configuring a network connection between the wireless base station 12 and each wireless device 10, arranging a space distribution status between the wireless devices 10, arranging a group and partition status between each wireless base station 12 and the wireless devices 10, or generating a configuration file.

For the different module characteristics, the wireless base station 12 can execute the interaction between the devices via the internal settings; it can also execute the data analysis computing via executing analysis software in the cloud server 14, to achieve the interaction of various systems. The wireless base station 12 can also analyze the data generated or sensed by each element of the wireless device 10, and upload an analyzed result to the server 14 after analysis, alternatively, the wireless base station 12 can directly upload the unanalyzed data to the server 14 without analysis, and the server 14 is responsible for analyzing and computing the data.

Additionally, each software and firmware installed in the wireless sensing system 1 can be updated remotely.

The external device 16 can be various light, chiller, pump, air handling unit (AHU), fan coil unit (FCU), exhaust fan, cooling water tower fan, total heat exchanger, fragrance outputting device, traffic signal, sprinkler, dehumidifier, air/water cleaner, but this specific example is not intended to limit the scope of the present disclosed examples.

The wireless device 10 can comprises wireless communicators 100, sensor 102, relay 104, control interface 106 (such as smart button), wired to wireless signal converter 108, analog input module 110, digital input module 112, analog output module 114, digital output module 116 and micro-controller 118 electrically connected to above-mentioned elements.

In one embodiment, the wireless communicator 100 can be the transceiver of ZigBee, Z-wave/Wi-Fi, Bluetooth Low Energy (BLE) of Bluetooth 4.0, 3G(WCDMA), 4G(LTE-A) and so forth. In one embodiment, the wireless communicator 100 comprises a built-in micro-controller.

The sensor 102 can detect the environment condition, the detecting content includes and not limits to: light, sunshine intensity, infrared ray, ultrasound, radio, microwave, temperature, humidity, gas, image, thermal induction, water level, pressure, position, electricity, flow (such as flow of water or gas), acceleration, gravity, sound (the unit is decibel), static electricity, liquid level, non-contact induction, CO concentration, CO2 concentration, suspending particles (such as the PM 2.5 suspending particles) concentration.

The relay 104 is user to automation switch the connected device. The control interface 106 can comprise one or more button(s) used to set up the specific function. The wired to wireless signal converter 108 can execute the serial port data conversion.

The analog input module 110 is used to input the analog signal, such as the status of the analog device 16 or the analog signal of the seismograph, to the micro-controller 118. The digital input module 112 is used to input the digital signal, such as the status of the digital device or the digital signal of the anisotropic magnetoresistance (AMR), to the micro-controller 118. The analog output module 114 is used to output the analog signal, such as the analog signal of the valves or frequency transformer, to the external device 16. The digital output module 116 is used to output digital signal, such as the digital signal of the switch, to the external device 16.

The micro-controller 118 has the basic computing function, for dealing and analyzing the data from the serial port (not shown in the figures), analog input module 110, digital input module 112 or sensor 102, and it can directly give the order to control the external device 16 after analyzing.

Above-mentioned element 100-118 can be independent units, any amount of the element 100-118 can be combined together to form a composite component.

This embodiment of the above-mentioned device is only the basic example, there are still many different embodiments in the present disclosed examples, without departing from the spirit and the substance of the invention, people skilled in this art should figure out the related changing and deformation according to the above-mentioned device, however, the related changing and deformation are belong to the technology feature disclosed by the present disclosed examples.

Figure 1C:
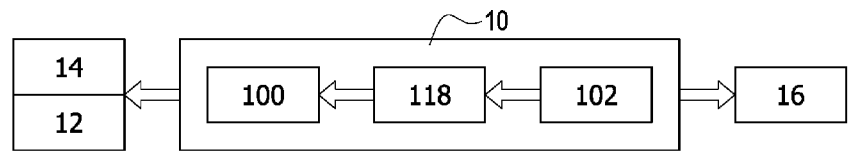
FIG. 1C is a flowchart schematic view according to one embodiment of the present disclosed examples.
Figure 1D:
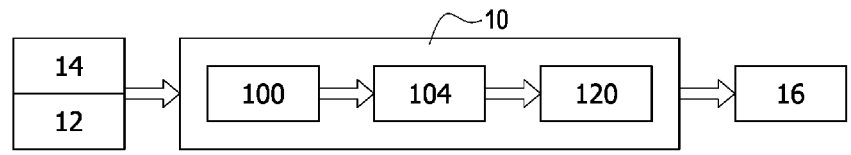
FIG. 1D is a flowchart schematic view according to the other embodiment of the present disclosed examples.
Figure 1E:
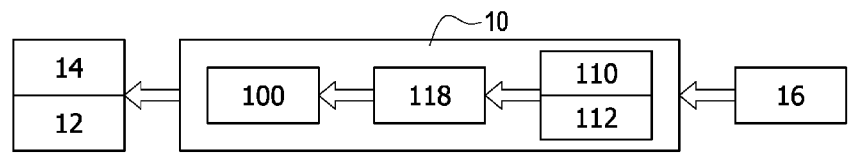
FIG. 1E is a flowchart schematic view according to the other embodiment of the present disclosed examples.
Figure 1F:
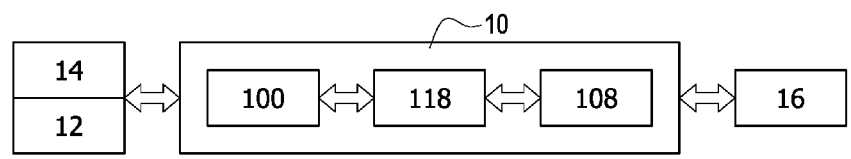
FIG. 1F is a flowchart schematic view according to the other embodiment of the present disclosed examples.
Figure 1G:
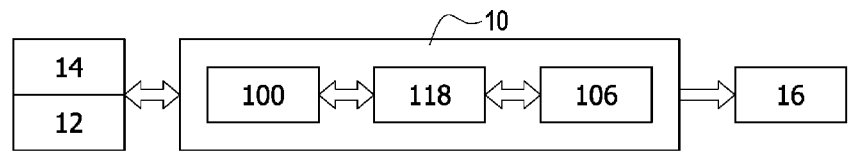
FIG. 1G is a flowchart schematic view according to the other embodiment of the present disclosed examples.
Figure 1H:
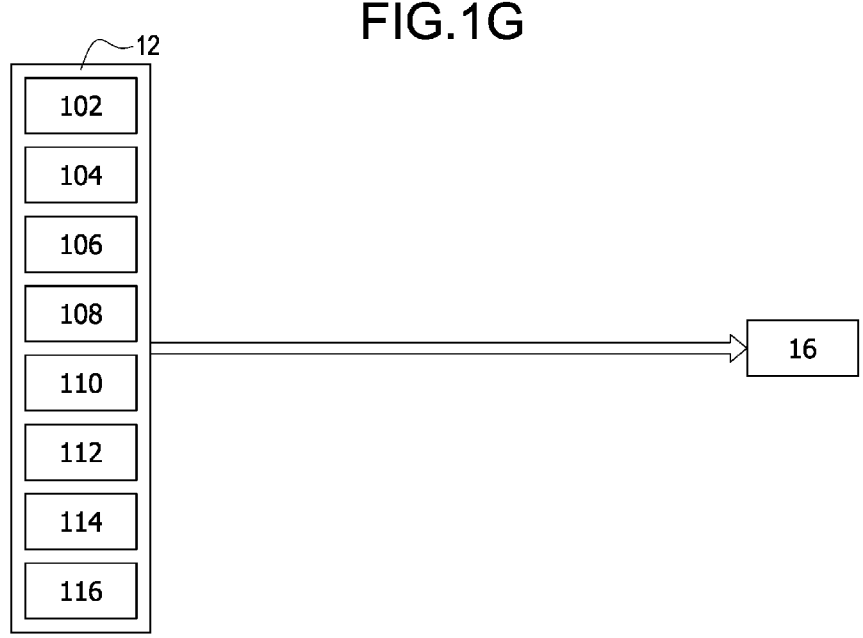
FIG. 1H is a flowchart schematic view according to the other embodiment of the present disclosed examples.

Please refer to FIG. 1C to FIG. 1H, FIG. 1C illustrates a flowchart schematic view according to one embodiment of the present disclosed example, FIG. 1D illustrates a flowchart schematic view according to the other embodiment of the present disclosed example, FIG. 1E illustrates a flowchart schematic view according to the other embodiment of the present disclosed example, FIG. 1F illustrates a flowchart schematic view according to the other embodiment of the present disclosed example, FIG. 1G illustrates a flowchart schematic view according to the other embodiment of the present disclosed example, FIG. 1H illustrates a flowchart schematic view according to the other embodiment of the present disclosed examples.

As shown in the FIG. 1C, in one embodiment, the sensor 102 can send the sensed data to the micro-controller 118. The micro-controller 118 processes the received data into the packets, and sends the packets to the server 14 for processing and analysis.

Besides, the micro-controllers 118 can also directly send the corresponding control comment to the external device 16 for control according to the configuration of its firmware after processing/analyzing the received data, and report the processing result to the server 14 via the wireless communicator 100.

As shown in the FIG. 1D, in one embodiment, the micro-controller 118 can control the AC or DC power source 120 via the relay 104 so as to switch the external device 16 after receiving the packets of the control signal form the server 14 via the wireless communicator 100 (and the wireless base station 12).

As shown in the FIG. 1E, in one embodiment, the micro-controller 118 reads the data from the external device 16 via the analog input module 110 or the digital input module 112, processes the data into the packets, and sends the packet to the server 14 to process and analyze via the wireless communicator 100 (and the wireless base station 12).

As shown in the FIG. 1F, in one embodiment, the micro-controller 118 is connected to the external device 16 via the wired to wireless signal converter 108. The micro-controller 118 processes the read data into the packets after reading the data from the external device 16 via the wired to wireless signal converter 108, and sends the packets to the server 14 to process and analyze via the wireless communicator 100 (and the wireless base station 12)

Then, the micro-controller 118 receives the control signal from the server 14 via the wireless communicator 100 (and the wireless base station 12), and controls the external device 16 connected to the wired to wireless signal converter 108 according to the control signal.

As shown in the FIG. 1Q in one embodiment, the micro-controller 118 reads the status of the control interface 106, processes the read status into the packets, and sends the packets to the server 14 to process and analyze via the wireless communicator 100 (and the wireless base station 12). Then, the micro-controller 118 receives the control signal from the server 14 via the wireless communicator 100 (and the wireless base station 12), and controls the corresponding external device 16 according to the control signal (the corresponding relationship between the statuses of the control interface 16 and the external device 16 is configured via the firmware in advance).

Alternatively, the micro-controller 188 can directly generates the control signal according to the read status, and control the corresponding external device 16 according to the generated control signal.

As shown in the FIG. 1H, in one embodiment, the wireless base station 12 comprises all or parts of the element 102-116. The wireless base station 12 can process or analyze the data sensed by the sensor 102 comprised in the wireless base station 12, transform the result of processing and analysis into the control signal, and send the control signal to the external device 16 which the user wants to control (the relationship between the result of processing and analysis and the external device 16 is configured in advance) to control the action of the external device 16.

In one embodiment, the wireless base station 12 or the wireless device 10 can record the environment information (such as real-time data and history data) of the sensor 102 in a database (not shown in figures) of the server 14 periodically in the daily life for providing the server 14 to analyze and build models.

In one embodiment, the server 14 can compare the real-time data of sensor 102 and the models, transform the result into the control packets, send it to the wireless base station 12 or send it to the wireless device 10 via wireless communicator 100. After receiving the control packets, the micro-controller 108 of the wireless base station 12 or the wireless device 10 can process the received control packets, and control the external device 16 connected to the analog output module 114 or the digital output module 116 according to the result of process.

Via the ecosystem of wireless smart sensing and controlling, the ecosystem of wireless smart sensing and controlling can work with the different systems, such as the city security, the building managing system, the road and traffic management system, the environment and air quality monitoring system, the dam and agricultural automation system, and the smart building, to achieve the object of increasing the efficiency, energy saving and intellectualization. This embodiment of the above-mentioned device is only the basic example, there are still many different embodiments in the present disclosed examples; without departing from the spirit and the substance of the present disclosed examples, people skilled in this art should figure out the related changing and deformation according to the above-mentioned device; however, the related changing and deformation are belong to the technology feature disclosed by the present disclosed examples.

In one embodiment, the user can use the program or webpage to adjust the wireless sensing system. For example the user can operate the mobile device to execute the arranged program, the arranged program can provide a program interface after being executed, the user can adjust the wireless sensing system via operating the program interface, the process is as following: the use going to the space where the user wants to configure, to install each entity device and module; using the configuration program to configure the Remote Telemetry Unit (RTU) server, wherein the interface of the configuration program includes the space drawing, allowing the user to identify the environment of the space and each entity device and module in the space; arranging the distribution of the device, each module in the system (which means to arrange the location in the space), allowing each device and modules in the configuration program to be connected to the entity devices and modules, whereby, the user can give the controlling order to the entity devices and modules via operating the configuration program; arranging the group and partition for each module in the system (for the regional controlling), such that the user can control the device to execute the different action according to the requirement of different region; and, saving the above-mentioned actions as configuration files, allowing the RTU to use.

In another example, the user can operate the mobile device to load the web to adjust the wireless sensing system. More specifically, the mobile device can display a web interface after loading the web to provide the user to check the status of each sensor 102 or send a comment to control each device via the web interface.

The software and the firmware of each device and module can be updated online via the configuration program or the web, to change the configuration file of each device and module, whereby, each device and module can execute the corresponding action according to the real-time condition and the different requirement.

The embodiments of the above-mentioned processing, program and web interface are only the basic examples, there are still many different embodiments of processing, program and web interface in the present disclosed examples; without departing from the spirit and the substance of the present disclosed examples, people skilled in this art should figure out the related changing and deformation according to the above-mentioned processing, program and web interface; however, the related changing and deformation are belong to the technology feature disclosed by the present disclosed examples.

The present disclosed example further discloses a real-time lighting control system based on above-mentioned technology, the disclosed real-time lighting control system can automatically control the lighting device located near the user according to the user's position.

Figure 2:
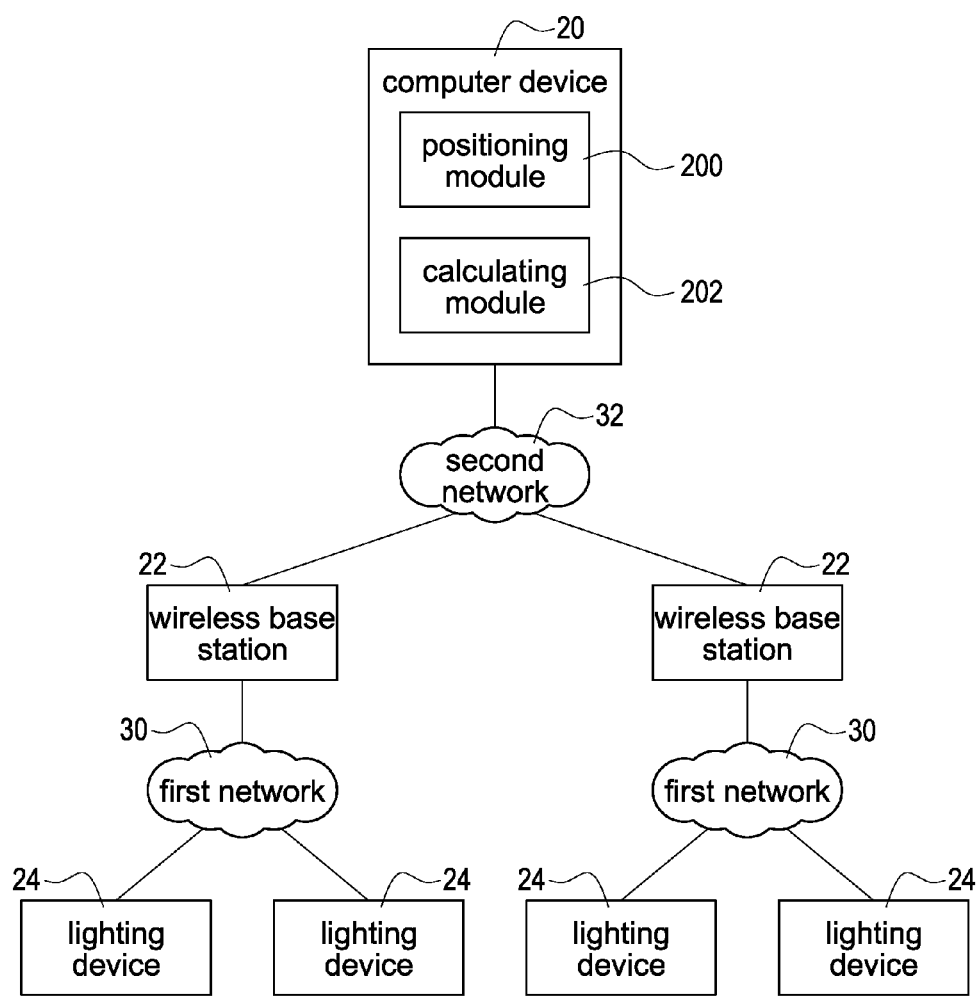
FIG. 2 is an architecture diagram of a real-time lighting control system according to one embodiment of the present disclosed examples.
Figure 3:
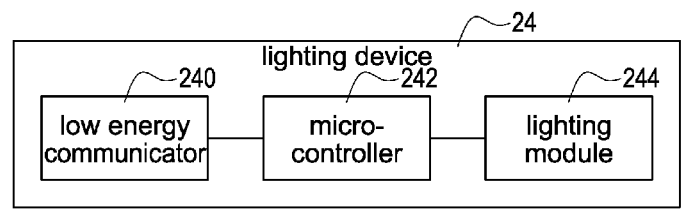
FIG. 3 is an architecture diagram of the lighting device of FIG. 2.
Figure 4:
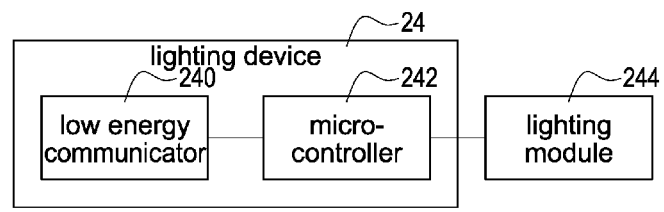
FIG. 4 is another architecture diagram of the lighting device of FIG. 2.
Figure 5:
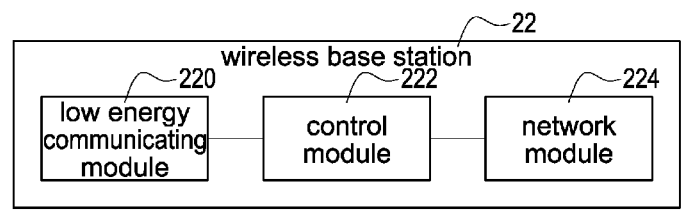
FIG. 5 is an architecture diagram of the wireless base station of FIG. 2.
Figure 6:
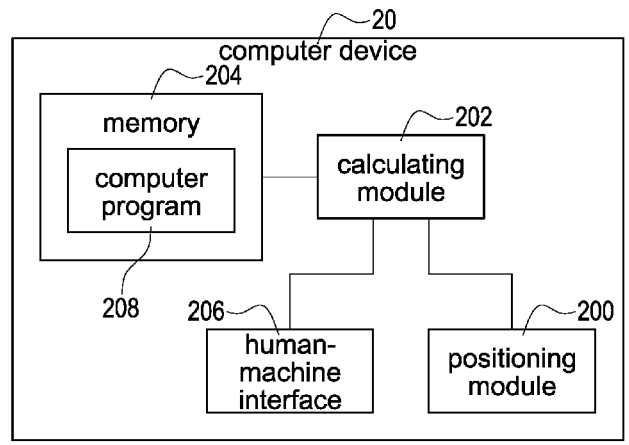
FIG. 6 is an architecture diagram of the computer device of FIG. 2.

Please refer to the FIG. 2 to FIG. 6, FIG. 2 illustrates an architecture diagram of a real-time lighting control system according to one embodiment of the present disclosed examples, FIG. 3 illustrates an architecture diagram of the lighting device of FIG. 2, FIG. 4 illustrates another architecture diagram of the lighting device of FIG. 2, FIG. 5 illustrates an architecture diagram of the wireless base station of FIG. 2, FIG. 6 illustrates an architecture diagram of the computer device of FIG. 2.

As shown in FIG. 2, the real-time lighting control mainly comprises the computer device 20, a plurality of wireless base stations 22 and a plurality of lighting devices 24 (taking two wireless base stations 22 and four lighting devices 24 for example in the FIG. 2).

Figure 12A:
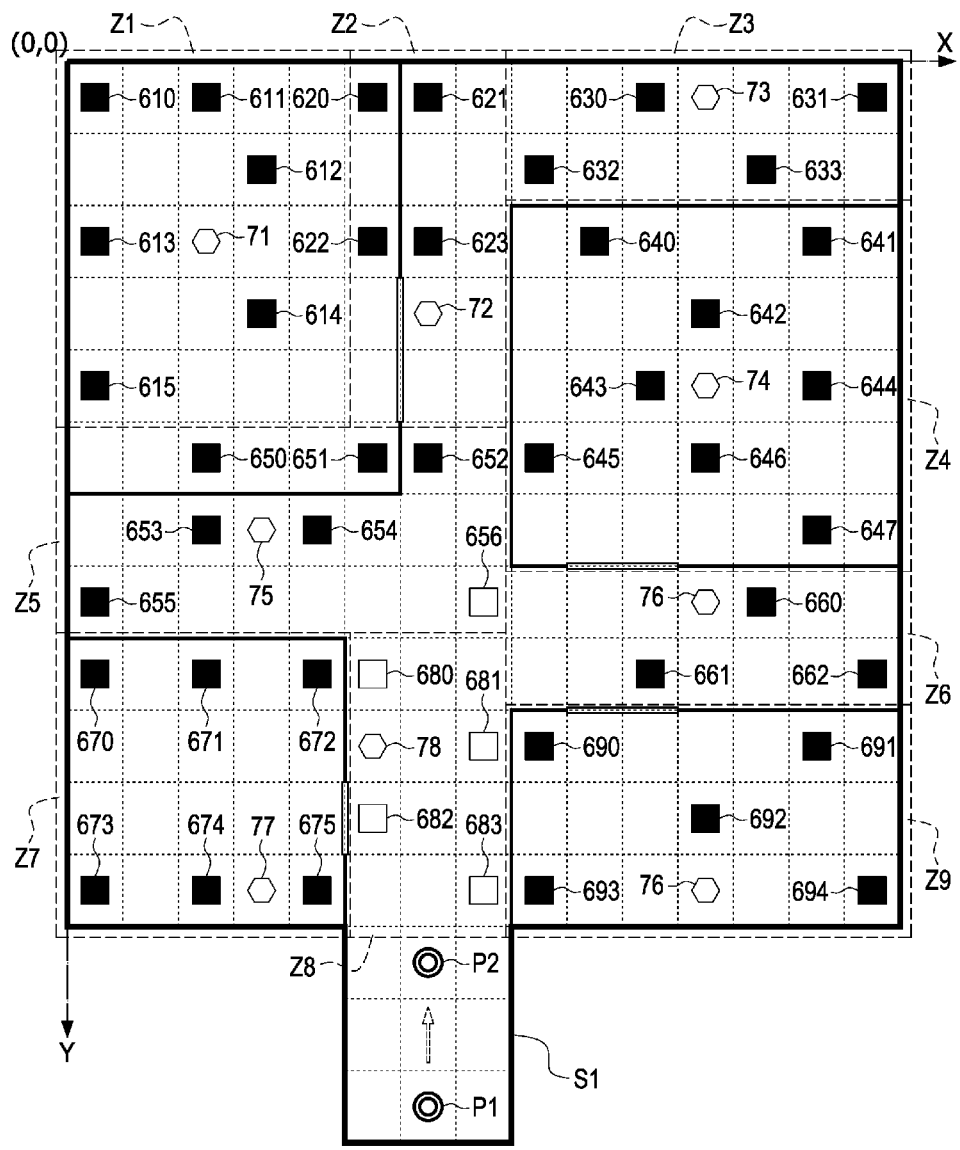
FIG. 12A is a first schematic view of the real-time lighting control according to the disclosed examples.

The lighting device 24 is arranged in a plurality of lighting regions in the indoor space (such as the lighting region Z1-Z9 in the indoor space S1 shown in the FIG. 12A). The architecture of each lighting device 24 is similar to the wireless device 10 shown in FIG. 1A, the relevant description is omitted for brevity and only the differences will be described in the following description.

As shown in FIG. 3, in one embodiment, each lighting device 24 comprises a low energy communicator 240, a lighting module 244 (such as LED module), and a micro-controller electrically connected to above-mentioned elements. The low energy communicator 240 is used to connect to the first network 30, and communicates with the wireless base station 22 arranged in the same lighting region as the lighting device 24 via the first network 30. The lighting module 244 is used to provide the lighting; the micro-controller 242 is used to control the lighting device 24. In this embodiment, the lighting device 24 can be but not limit to smart bulb.

As shown in FIG. 4, in one embodiment, each lighting device 24 doesn't comprise the built-in lighting module 244, and the lighting device 24 is connected to the external lighting module 244 via an external connection. Thus, when the lighting module 244 fails, the user only needs to replace the cheap lighting module 244, and doesn't have to replace the expensive whole lighting device 24, so as to effectively reduce the cost of maintenance. Besides, the user can selectively installs the lighting modules 244 with the different illuminations each other according to the user's requirement, so as to provide more lighting selections. In this embodiment, the lighting device 24 can be but not limit to smart lamp-holder.

The wireless base station 22 is respectively arranged in above-mentioned lighting regions, has ability of sending the wireless signal used for positioning. Above-mentioned wireless signal can be Radio Frequency (RF) signal, sound-wave signal, water-wave signal, electricity-wave signal, magnetism-wave signal or the other signals which changing (such as change of intensity, weight, pressure, length, vision, odor concentration, color depth or brightness) with distance, so as to make the device (such as the computer device 20) which receiving above-mentioned signal can calculate the distance between the device and each wireless base station 22 according to the amount of change of the wireless signal. The architecture of each wireless base station 22 is similar to the wireless base station 12 shown in FIG. 1A, the relevant description is omitted for brevity and only the differences will be described in the following description.

As shown in FIG. 5, in one embodiment, each wireless base station 22 comprises a low energy communicating module 220, a network module 224 and a control module 222 electrically connected to above-mentioned elements.

The low energy communicating module 220 has the gateway function, so as to have ability of establishing the first network 30 in the located lighting region, and connect to the lighting device 24 arranged in the same lighting region via the first network 30.

Furthermore, the low energy communicating module 220 and the low energy communicator 240 are the same type of network device (namely, the low energy communicating module 220 and the low energy communicator 240 can communicate with each other via using the same low energy communication protocol).

The network module 224 is used to send the wireless signal, and connects to the computer device 20 via the second network 32. More specifically, the network module 224 has the Access Point (AP) function, so as to establishing the second network 32 and connect to the computer device 30 via the second network 32.

The control module 222 is used to control wireless base station 22. More specifically, after connecting to the lighting device 24 (taking connecting two lighting device 24 for example in the FIG. 2) via the low energy communicating module 220 and the first network 30, the control module 222 can control the connected lighting device 24 (such as switching the lighting device 24, adjusting the brightness of lighting device 24 or retrieving the current status of the lighting device 24). After connecting to the computer device 20 via the network module 224 and the second network 32, the control module 222 can receive the lighting control signal from the computer device 20, and control the lighting device 24 according to the content of the lighting control signal.

In one embodiment, the wireless signal sent by the wireless base station 22 is the RF signals in the specific frequency band and conforms to the IEEE 802.11 standard (such as the Wi-Fi signal of 2.4 GHz or 5 GHz). Besides, the control module 222 retrieves the Service Set Identifier (SSID) which the user configured in advance and/or the Media Access Control Address (MAC address) of the network module 224, encapsulates the SSID and/or the MAC address into the packet data and sends the packet data to the network module 224. The network module 224 transforms the received packet data into above-mentioned wireless signal and broadcasts the wireless signal.

Because the SSID and the MAC address can be used to establish the wireless network connection, the wireless signal of this embodiment can have the positioning function and the network-connecting function simultaneously.

The computer device 20 (such as notebook, tablet, smartphone, wearable device or the other mobile devices) is held by the user. As shown in FIG. 6, in one embodiment, the computer device 20 comprises the positioning module 200 and the calculating module 202, so as to execute the real-time lighting control to the wireless base station 22. The computer device 20 further comprises a memory 204 and a human-machine interface 206 (such as touchscreen, display, buttons or any combination of above-mentioned device). Besides, the calculating module 202 (taking CPU for example in this embodiment) is electrically connected to the positioning module 200 (taking network device for example in this embodiment), memory 204 and the human-machine interface 206.

Additionally, the positioning module 200 and the network module 224 of the wireless base station 22 are the same type of the network device (namely, the positioning module 200 and the network module 224 can communicate with each other via using the same network protocol).

In one embodiment, the first network 30 is Bluetooth Low Energy (BLE) network, Zig-Bee network, Z-wave network, optical communication network, sound-wave communication network or the other network having the characteristic of low energy or short-distance transmission. The low energy communicator 240 and the low energy communicating module 220 are the transceiver which supporting anyone of above-mentioned network type. The second network 32 is the Internet, Ethernet, Wi-Fi network, mobile network (such as 3G mobile network or 4G mobile network) or the other network having the characteristic of high-speed transmission or long-distance transmission, the network module 224 and the positioning module 200 are the transceiver which supporting anyone of above-mentioned network type.

Figure 7:
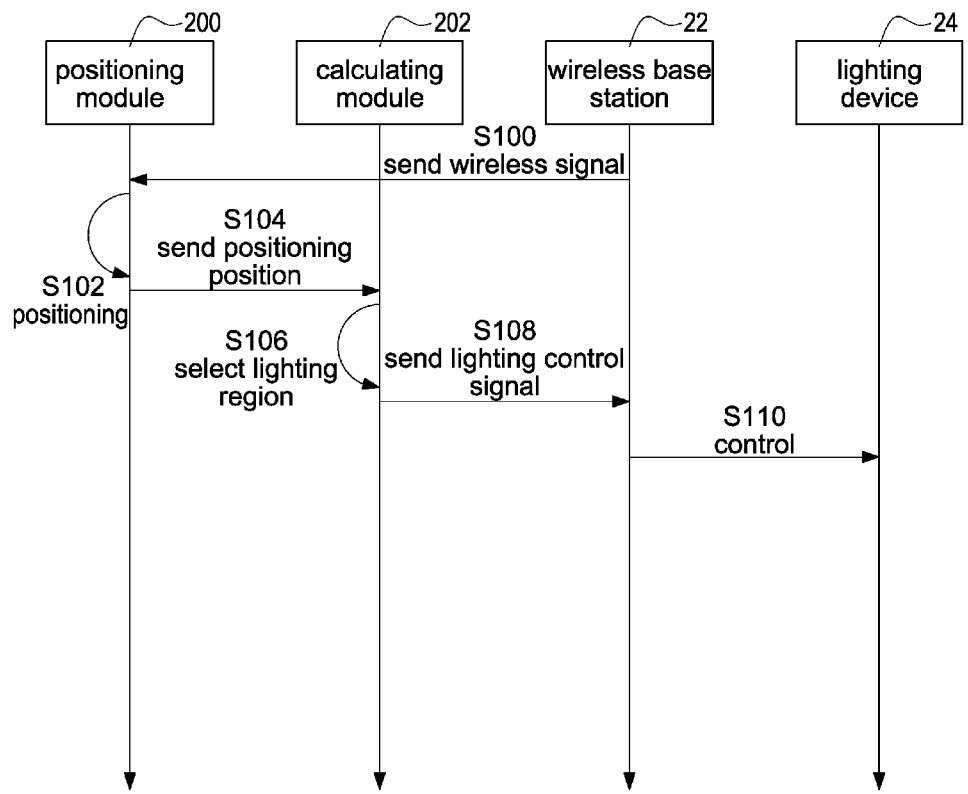
FIG. 7 is a sequence diagram of a real-time lighting control method according to one embodiment of the present disclosed examples.

Please refer to FIG. 7, which illustrates a sequence diagram of a real-time lighting control method according to one embodiment of the present disclosed examples, and is used to explain how the real-time lighting control system 2 executes the real-time lighting control. More specifically, the memory 204 of the computer device 20 further stores the computer program 208 (such as remote-control application program or web browser application program), and the computer program 208 can control the computer device 20 to execute following operations after being executed.

Before executing the real-time control, the user can make the indoor space coordinate, and store the arranged position (could be express in form of coordinate) of each wireless base station 22 in the indoor space in the memory (such as the memory 204 or the memory of the positioning module 200). Besides, the user can further record the distributing information of the lighting regions in the indoor space in the space information, and store the space information in the memory (such as the memory 204 or the memory of the positioning module 200).

When executing the real-time control, each wireless base station 22 broadcasts the wireless signal used to positioning continuously or intermittently (step S100).

Then, the positioning module 200 senses the wireless signal around continuously, and loads the arranged position of the wireless base station 22 which sending the received wireless signal when receiving the wireless signal, and determines a set of positioning location according to the signal intensity of the wireless signal (such as the Received Signal Strength Indicator (RSSI) value of the received wireless signal) and the arranged position of the wireless base station 22 (step S102).

In one embodiment, the position module 200 transforms the RSSI value into an actual distance via using the pre-stored algorithm of signal attenuation model according to the RSSI value. Additionally, the position module 200 determines the positioning position according to the actual distance and the arranged position of the wireless base station 22 which sending the received wireless signal.

In one embodiment, the positioning module 200 senses at least three wireless signals, dynamically determines above-mentioned positioning position according to the signal intensities of the at least three wireless signals and the arranged positions of the at least three wireless base stations 22 which sending above-mentioned received wireless signals (such as determining the positioning position via using the Three-point positioning technology).

Then, the positioning module 200 sends the determined positioning position to the calculating module 202 (step S104).

In one embodiment, the positioning position 200 senses the wireless signals continuously, determines the positioning positions of the positioning module 200 corresponding to the different time points continuously or intermittently, and sends the determined positioning positions to the calculating module 202 continuously.

Then, the calculating module 202 selects one of the lighting regions according to the pre-stored space information and the determined positioning positions (step S106).

In one embodiment, the calculating module 202 determines a predicted movement direction (namely, predicting the movement direction which the user moves next) according to the distributing information and the determined positioning positions, and selects the lighting region which the positioning module 200 approaches gradually and/or the lighting region which the positioning module 200 leaves gradually according to the predicted movement direction.

In one embodiment, the calculating module 202 determines the predicted movement direction via using the Particle Swarm Optimization (PSO) algorithm according to the distributing information of each lighting region in the indoor space and the determined positioning positions.

In one embodiment, the calculating module 202 calculates a steering angle or an acceleration of the positioning module 200 according to the determined positioning positions, and determines the predicted movement direction according to the steering angle or the acceleration.

In one embodiment, the calculating module 202 calculates a predicted movement scope, selects one of the lighting regions according to an overlapping ratio of each lighting region overlapping the predicted movement scope.

Then, the calculating module 202 recognizes the wireless base station 22 arranged in the selected lighting region, and sends a set of lighting control signal to this recognized wireless base station 22 (step S108).

In one embodiment, the calculating module 202 sends the lighting control signal used to raise or turn on the lighting to the wireless base station 22 arranged in the lighting region which the positioning module 200 approaches gradually, and sends the lighting control signal used to reduce or turn off the lighting to the wireless base station 22 arranged in the lighting region which the positioning module 200 leaves gradually.

In one embodiment, above-mentioned space information further records the information of connecting relationship of the wireless base station 22 and the lighting device 24, the arranged position of each lighting device 24 and the aisle distribution information of the indoor space. The calculating module 202 selects one of the lighting devices 24 arranged in the selected lighting region according to the aisle distribution information, recognizes the wireless base station 22 connected to the selected lighting device 24 according to the information of connecting relationship, and sends the lighting control signal to the recognized wireless base station 22.

Finally, the wireless base station 22 can control the corresponding lighting device 24 according to this lighting control signal after receiving above-mentioned lighting control signal (step S110).

Thus, the present disclosed examples can effectively provide the lighting according to the user's position and prevent from a waste of electricity.

Figure 8:
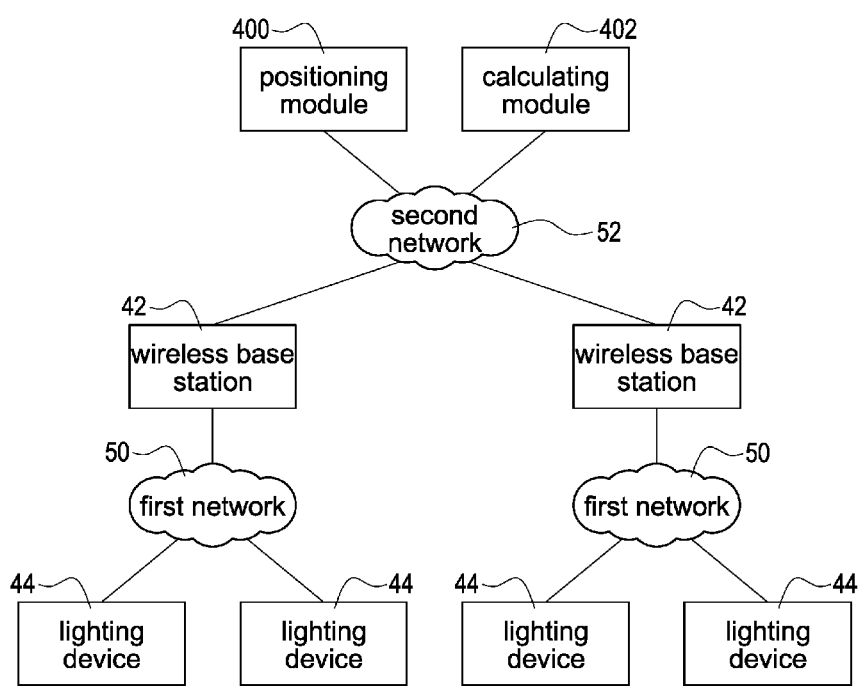
FIG. 8 is a flowchart of a real-time lighting control method according to the other embodiment of the present disclosed examples.

Please refer to FIG. 8 illustrates a flowchart of a real-time lighting control method according to the other embodiment of the present disclosed examples. The real-time lighting control system 4, the positioning module 400, the calculating module 402, the wireless base stations 42, the lighting devices 44, the first networks 50 and the second network 52 of this embodiment are the same or similar to the real-time lighting control system 2, the positioning module 200, the calculating module 202, the wireless base stations 22, the lighting devices 24, the first networks 30 and the second network 32 shown in FIG. 2, the relevant description is omitted for brevity and only the differences will be described in the following description.

In this embodiment, the calculating module 402 (such as server which can be the same or similar to the server 14 shown in FIG. 1A) and the positioning module 400 (such as notebook, tablet, smartphone, wearable device, or the other mobile devices) are arranged separately (the calculating module 402 is arranged in the cloud, the positioning module 400 is held by the user), and connect to each other via the second network 52.

In this embodiment, the network module of the calculating module 402, the positioning module 400 and the wireless base station 42 communicate with each other via using the same network communication protocol.

Via implementing the calculating module 402 in cloud computing approach, the present disclosed example can effectively reduce the usage of computing resource of the positioning module 400 held by the user, so as to make the present disclosed example is applicable to more low-end computer devices.

Figure 9:
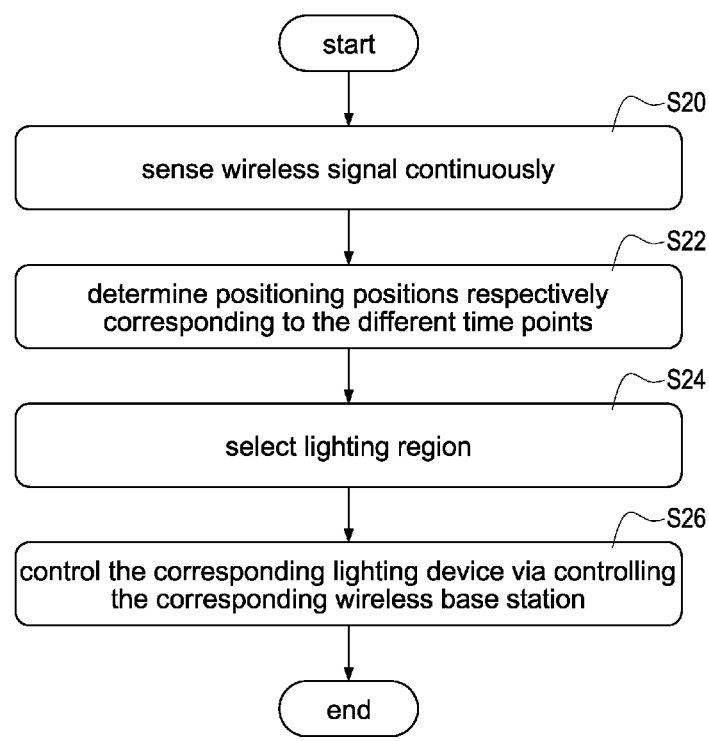
FIG. 9 is a flowchart of a real-time lighting control method according to the other embodiment of the present disclosed examples.

Please refer to FIG. 9, which illustrates a flowchart of a real-time lighting control method according to the other embodiment of the present disclosed examples. The real-time lighting control method in each embodiment can be implemented by the real-time lighting control system 2 as illustrated in FIG. 2 or the real-time lighting control system 4 as illustrated in FIG. 8. For convenience, the following description will take the real-time lighting control system 2 as illustrated in FIG. 2 for explanation.

In the first, the positioning module 200 senses the wireless signals sent from the wireless base stations 22 around continuously (step S20), determines the positioning positon respective corresponding to the different time points according to the sensed wireless signals and the arranged positions of the wireless base stations 22 which sending the sensed wireless signals, and sends the determined positioning positions to the calculating module 202 (step S22).

Please be noted that, because the positioning module 200 is network device, the positioning module 200 can directly scan the other same type network device without establishing a connection, and sense the signal intensities of the wireless signals sent by the other network device.

Take the positioning module 200 being Wi-Fi network module, the wireless base station 22 being Wi-Fi AP for example, the positioning module 200 can directly scan the wireless signals sent by the wireless base stations 22 around, and retrieve the signal intensity of the wireless signal sent from this wireless base stations 22 without establishing the connection with any wireless base station 22.

Besides, because the wireless signal comprises the SSID and/or the MAC address of the wireless base station 22, the positioning module 200 can recognize the wireless base station 22 according to above-mentioned SSID and/or MAC address for loading the arranged position of this wireless base station 22.

Because the present disclosed example doesn't have to establish the connection, the present disclosed example can make the positioning module 200 scan the wireless signals of the wireless base stations 22 fast and simultaneously, so as to effectively improve the positioning speed.

Then, the calculating module 202 selects one of the lighting regions according to the space information and the received positioning position (step S24).

Finally, the calculating module 202 sends the lighting control signal to the wireless base station 22 arranged in the selected lighting region for controlling the lighting device 24 connected to this wireless base station 22 (step S26).

Figure 10:
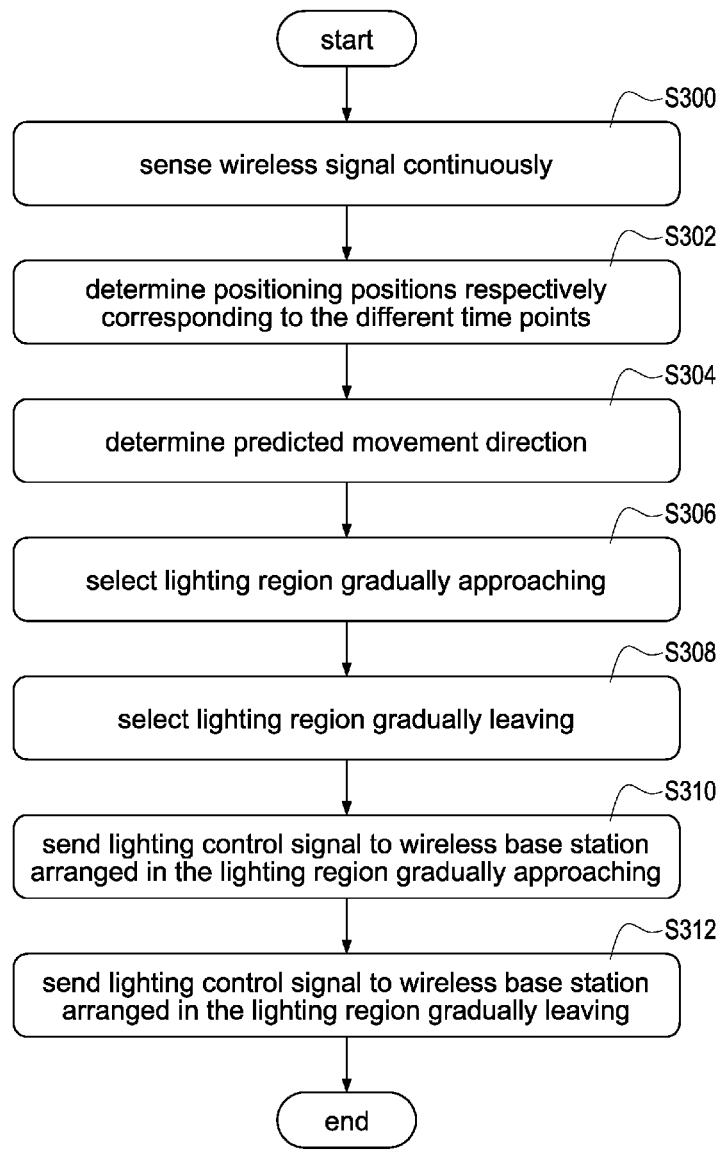
FIG. 10 is a flowchart of a real-time lighting control method according to the other embodiment of the present disclosed examples.

Please refer to FIG. 10, which illustrates a flowchart of a real-time lighting control method according to the other embodiment of the present disclosed examples.

In the first, the positioning module 200 senses the wireless signals sent by the wireless base stations 22 continuously (step S300), determines the positioning positions respectively corresponding to the different time points according to the wireless signals and the arranged positions of the corresponding wireless base stations 22, and sends the determined positioning positions to the calculating module 202 (step S302).

Then, the calculating module 202 determines the predicted movement direction according to the distributing information of the lighting regions in the indoor space and the determined positioning positions (step S304).

In one embodiment, the calculating module 202 determines the predicted movement direction via using the Particle Swarm Optimization algorithm according to the distributing information of the lighting regions in the indoor space and the determined positioning positions.

In one embodiment, the calculating module 202 calculates a steering angle or an acceleration of the positioning module 200 according to the determined positioning positions, and determines the predicted movement direction according to the steering angle or the acceleration.

Please be noted that the calculating module 202 can calculate the acceleration of the positioning module 200 via using following formula (1).

$$a=(2(S-V_0 \times t))/t^2 \qquad (1),$$

wherein "a" represents the acceleration, "S" represents the displacement, "V" represents the initial velocity, "t" represents the time.

More specifically, during the movement by walking, most of users will unconsciously change his/her movement direction, movement velocity or steering angle of body in advance according to the movement direction predetermined by himself/herself (such as turning right, turning left or going straight at the intersection). Thus, via detecting the steering angle or the acceleration of the positioning module 200 (which corresponding to the steering angle or the acceleration of the user), this embodiment can effectively predict the movement direction at the next intersection of the user in advance.

Take determining whether the user will turn right at the next intersection for example, before arriving at the intersection, the user will usually greatly reduce the displacement of movement (namely, the acceleration is negative, and its absolute value is larger) for preventing from collision with the other user. Besides, before arriving at the intersection, the user will habitually turn his/her body to the direction which the user wants to go (such as right) for observing the right side of the intersection, or make his/her movement direction start to bias toward the direction which the user want to go (such as walking bias rightward). Thus, when determining that the user is closed to the intersection and above-mentioned characteristic(s) is detected, the calculating module 202 can determine that the user wants to turn at the next intersection, and determine the steering direction (namely, the predicted movement direction).

Take determining whether the user will go straight at the next intersection for example, before arriving at the intersection, the user will usually only slightly reduce the displacement of movement (namely, the acceleration is negative, and its absolute value is less), the user will not turn his/her body to the other direction, and not make his/her movement direction bias toward the other direction. Thus, when determining that the user is closed to the intersection and above-mentioned characteristic(s) is detected, the calculating module 202 can determine that the user want to go straight (namely, the predicted movement direction) at the next intersection.

Take determining whether the user will enter to the meeting room for example, before arriving at the entrance of the meeting room, the user will usually greatly reduce the displacement of movement for preventing from collision with the door of the meeting room. Besides, before arriving at the meeting room, the user will habitually turn his/her body to the direction of the entrance of the meeting room, or make his/her movement direction start to bias toward the direction of the entrance of the meeting room. Thus, when determining that the user is closed to the entrance of the meeting room and above-mentioned characteristic(s) is detected, the calculating module 202 can determine that the user wants to enter to the meeting room, and determine the predicted movement direction.

Then, the calculating module 202 selects the lighting region gradually approaching according to the distributing information of the lighting regions in the indoor space and the determined predicted movement direction (step S306), namely, the calculating module 202 calculates the lighting region which the user may enter when moving according to above-mentioned predicted movement direction.

Then, the calculating module 202 selects the lighting region gradually leaving according to the distributing information of the lighting regions in the indoor space and the determined predicted movement direction (step S308), namely, the calculating module 202 calculates the lighting region which the user may leave when moving according to above-mentioned predicted movement direction.

Then, the calculating module 202 generates a set of the lighting control signal, and sends the lighting control signal to the wireless base station 22 arranged in the lighting region gradually approaching (step S310), wherein above-mentioned lighting control signal is used to control the specific lighting device 24 to raise the illumination or start to provide the lighting.

More specifically, the space information further records the aisle distribution information of the indoor space, the calculating module 202 determines the wireless base station 22 which it wants to control according to above-mentioned distribution information, above-mentioned aisle distribution information and the arranged positions of the wireless base stations 22, and sends the lighting control signal to these wireless base stations 22. The wireless base stations 22 controls the specific lighting device 24 arranged in the same lighting region (such as control via sending the control signal to the specific lighting device 24) according to the received lighting control signal for raising the illumination or starting to provide the lighting of the lighting region which the wireless base stations 22 locates.

Besides, the calculating module 202 can further generate another set of the lighting control signal, and sends the lighting control signal to the wireless base station 22 arranged in the lighting region gradually leaving (step S312), wherein above-mentioned lighting control signal is used to control the specific lighting device 24 to reduce the illumination or stop providing the lighting.

More specifically, the calculating module 202 determines the wireless base station 22 which it wants to control according to above-mentioned distribution information, above-mentioned aisle distribution information and the arranged positions of the wireless base stations 22, and sends the lighting control signal to these wireless base stations 22. The wireless base stations 22 controls the specific lighting device 24 arranged in the same lighting region according to the received lighting control signal for reducing the illumination or stopping providing the lighting of the lighting region which the wireless base stations 22 locates.

Please be noted that the step S308, S312 are not the necessary steps of this embodiment, and may be omitted from execution.

In one embodiment, the wireless base station 22 turns off the specific lighting device 24 when doesn't receiving the lighting control signal related to the specific lighting device 24 again.

In one embodiment, the lighting device 24 comprise a built-in timer, and has ability of automatically stopping providing the lighting or turning off when a default time (such as 10 seconds) elapses and the lighting device 24 is not controlled again by the wireless base station 22.

Via predicting the movement direction of the user to raise the lighting of the lighting region which the user may enter, the present disclosed example can provide the user the adequate lighting all the time, so as to provide the excellent user experience. Besides, via predicting the movement direction of the user to reduce the lighting of the lighting region which the user may leave, the present disclosed example can provide the user the adequate lighting and save energy.

Figure 11:
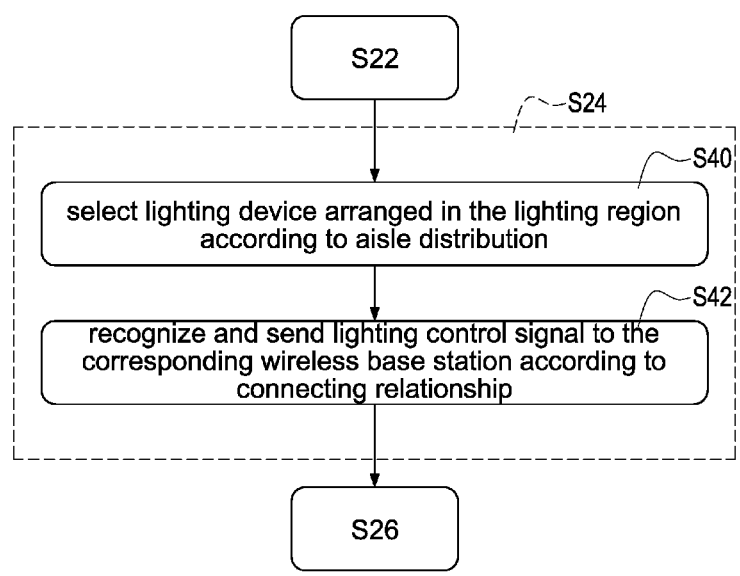
FIG. 11 is a part of flowchart of a real-time lighting control method according to the other embodiment of the present disclosed examples.

Please refer to FIG. 11, which illustrates a part of flowchart of a real-time lighting control method according to the other embodiment of the present disclosed examples. In this embodiment, the space information further records the information of connecting relationship of the wireless base station 22 and the lighting device 24, the arranged position (which can be expressed in coordinates) of each lighting device 24 in the indoor space and the aisle distribution information of the indoor space (namely, the movable range for the user).

The difference between this embodiment and the embodiment shown in FIG. 9 is that the step S24 of this embodiment further comprises following steps.

The step S40: the calculating module 202 selects one of the lighting devices 24 arranged in the selected lighting region according to the aisle distribution information.

The step S42: the calculating module 202 recognizes the wireless base station 2 connected to the selected lighting device 24 according to the information of connecting relationship, and sends the lighting control signal to the recognized wireless base station 22, wherein the lighting control signal is used to control the specific lighting device 24 to reduce the illumination or stop providing the lighting, or is used to control the specific lighting device 24 to raise the illumination or start to provide the lighting.

Figure 12B:
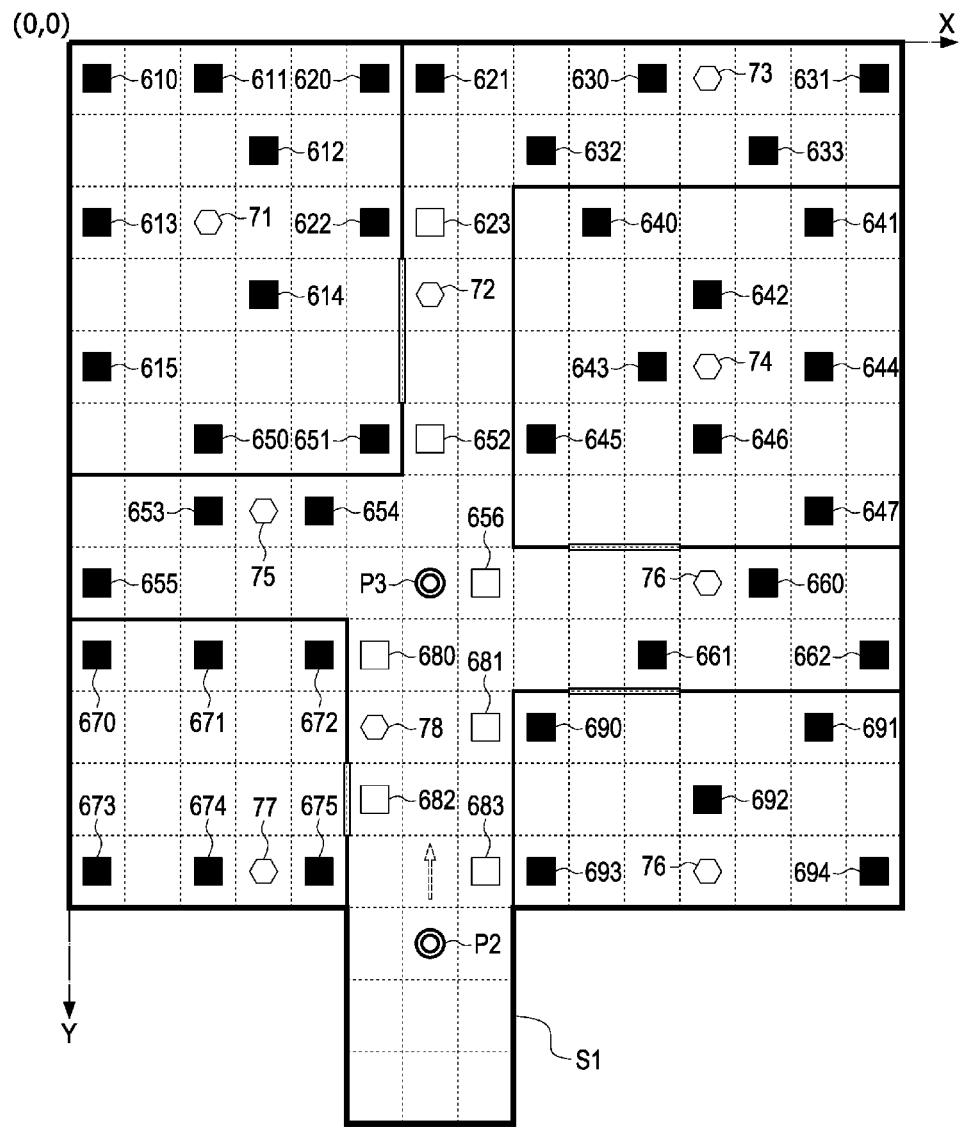
FIG. 12B is a second schematic view of the real-time lighting control according to the disclosed examples.
Figure 12C:
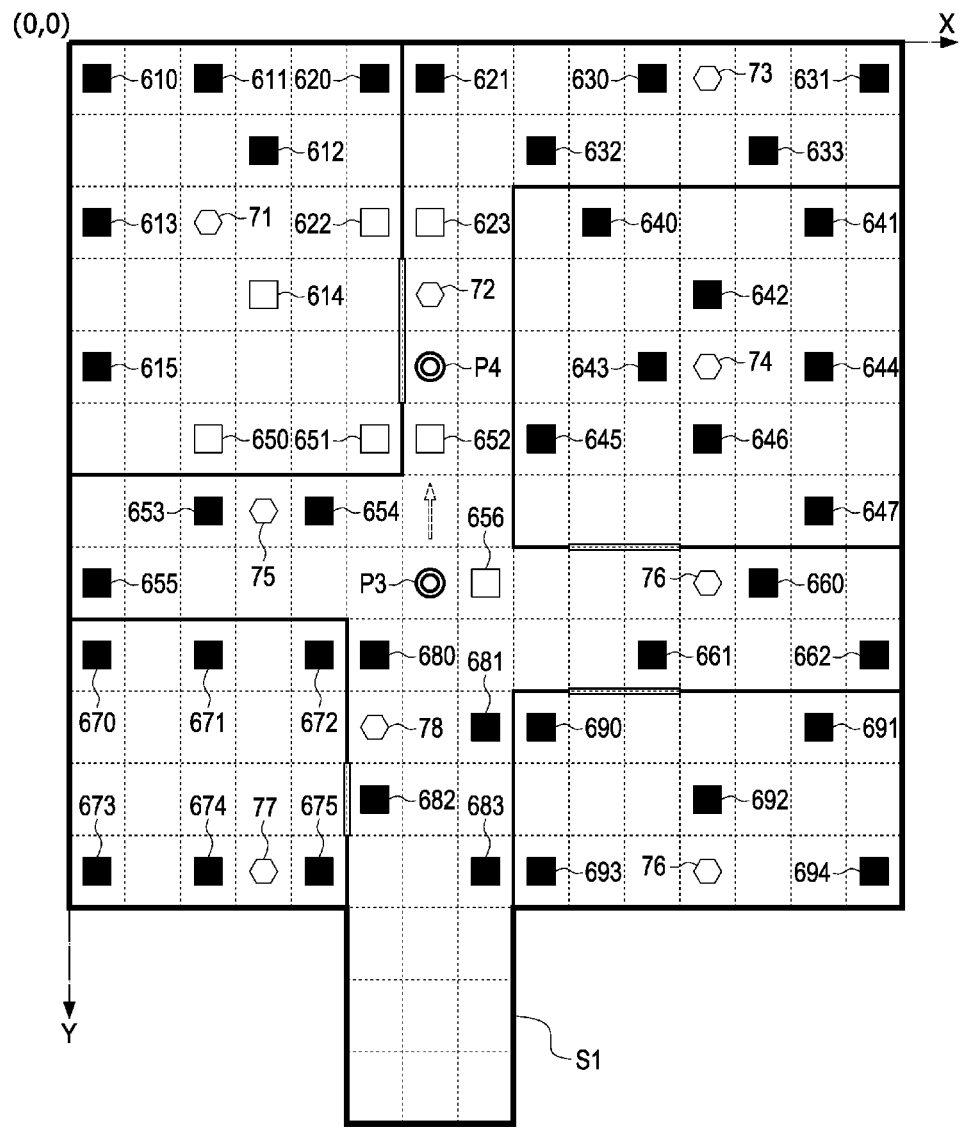
FIG. 12C is a third schematic view of the real-time lighting control according to the disclosed examples.
Figure 12D:
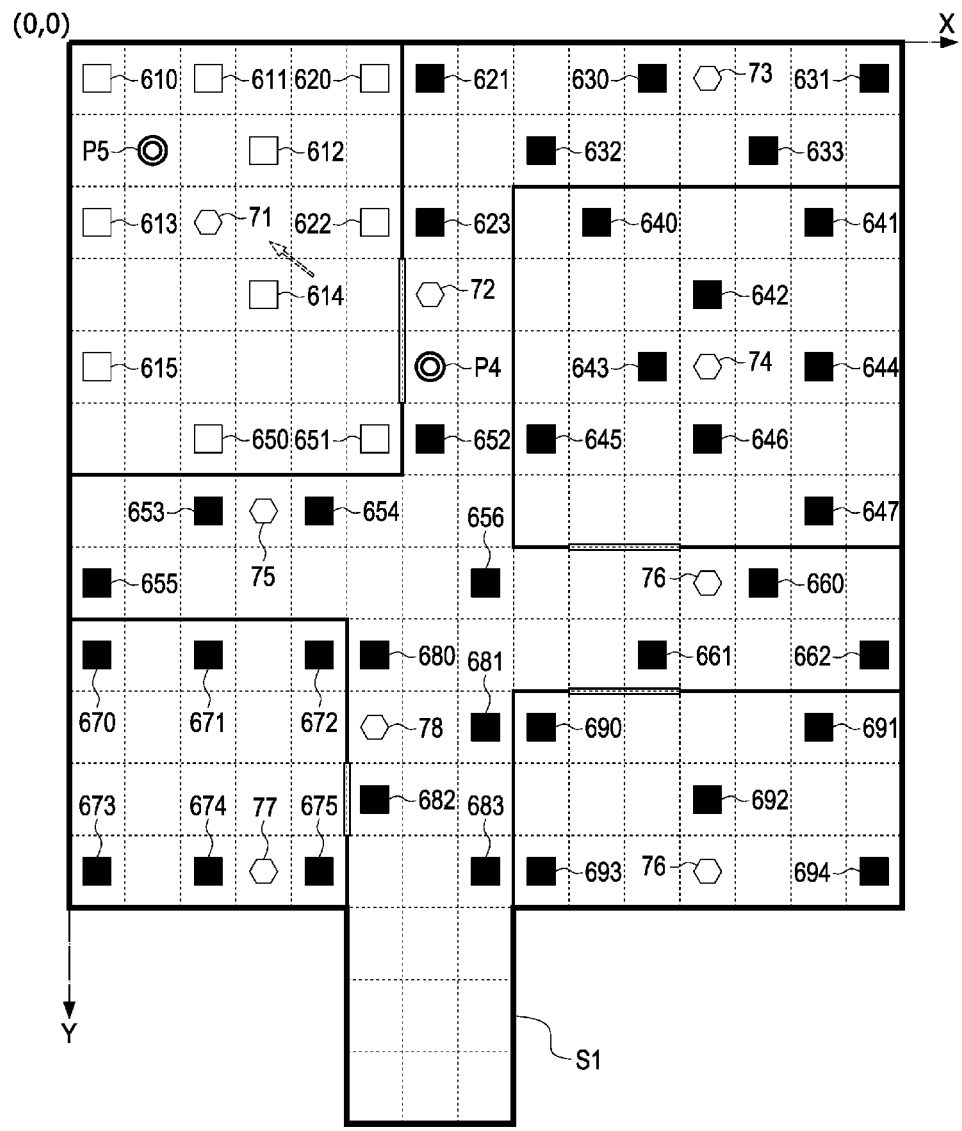
FIG. 12D is a fourth schematic view of the real-time lighting control according to the disclosed examples.
Figure 12E:
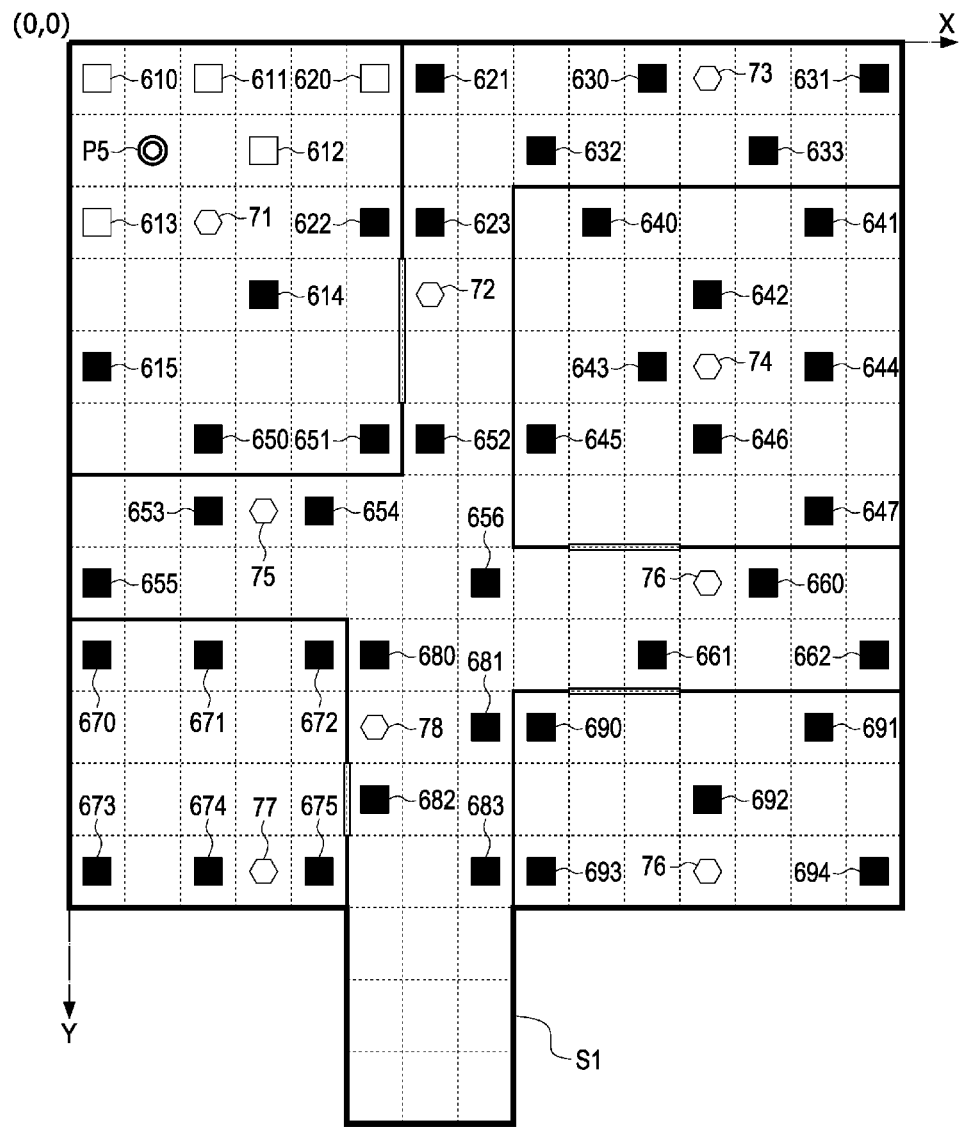
FIG. 12E is a fifth schematic view of the real-time lighting control according to the disclosed examples.

Please refer to FIG. 12A to FIG. 12E simultaneously, FIG. 12A illustrates a first schematic view of the real-time lighting control according to the disclosed examples, FIG. 12B illustrates a second schematic view of the real-time lighting control according to the disclosed examples, FIG. 12C illustrates a third schematic view of the real-time lighting control according to the disclosed examples, FIG. 12D illustrates a fourth schematic view of the real-time lighting control according to the disclosed examples, FIG. 12E illustrates a fifth schematic view of the real-time lighting control according to the disclosed examples.

First to describe the present disclosed example how to set up the real-time lighting control environment. As shown in FIG. 12A, after arranging the wireless base stations 71-79 and the light device 610-694 in the indoor space S1, the user can first use the management program or the configuration program to process the floor plan of the indoor space S1 (which comprises the aisle distribution information) to make the indoor space S1 be coordinateized into an X-Y coordinate system.

One embodiment, the origin of the X-Y coordinate locates at upper left corner of the indoor space S1, the right direction is the X-axis positive, the down direction is the Y-axis positive. Above-mentioned planning means can make the arrangement of the X-Y coordinate is consistent with the arrangement of the indexes of the matrix, and be conducive to programmed and simplifying the computational complexity.

Then the user can configure the arranged positions (namely, the coordinate value) of each wireless base station 71-79 and each lighting device 610-694, and configure the information of connecting relationship between all the wireless base stations 71-79 and all the lighting devices 610-694 (namely, make each lighting device 610-694 connect to one wireless base station 71-79 and be controlled by the connected wireless base station 71-79).

Then, the user can divide the indoor space S1 into lighting regions Z1-Z9, there is at least one wireless base station(s) 71-79 arranged in each lighting region Z1-Z9, and the at least one wireless base station(s) 71-79 can control all the lighting device 610-694 individually or jointly.

In this example, the wireless base station 71 arranged in the lighting region Z1 can control all the lighting deices 610-615 arranged in the same lighting region Z1; the wireless base station 72 arranged in the lighting region Z2 can control all the lighting deices 620-623 arranged in the same lighting region Z2; the wireless base station 73 arranged in the lighting region Z3 can control all the lighting deices 630-623 arranged in the same lighting region Z3; the wireless base station 74 arranged in the lighting region Z4 can control all the lighting deices 640-647 arranged in the same lighting region Z4; the wireless base station 75 arranged in the lighting region Z5 can control all the lighting deices 650-656 arranged in the same lighting region Z5; the wireless base station 76 arranged in the lighting region Z6 can control all the lighting deices 660-662 arranged in the same lighting region Z6; the wireless base station 77 arranged in the lighting region Z7 can control all the lighting deices 670-675 arranged in the same lighting region Z7; the wireless base station 78 arranged in the lighting region Z8 can control all the lighting deices 680-683 arranged in the same lighting region Z8; and, the wireless base station 79 arranged in the lighting region Z9 can control all the lighting deices 690-694 arranged in the same lighting region Z9.

Finally, the user can operate the computer device 20 to encapsulate the coordinatized floor plan, the arranged positions of each wireless base station 71-79 and each lighting device 610-694, the distributing information of the lighting regions Z1-Z9 in the indoor space S1 and the information of connecting relationship between the wireless base stations 71-79 and the lighting device 610-694 into the space information, and store the space information in the computer device 20.

Before execution of real-time lighting control, the user can first enable the positioning module 200 of the computer 20 (in this example, the computer device 20 is a smartphone and held by the user, the positioning module 200 is a Wi-Fi network module) for making the positioning module 200 sense the wireless signals continuously sent by the wireless base stations 71-79.

As shown in FIG. 12A, during the user moving from the position P1 to the position P2, the computer device 20 continuously senses the wireless signals sent by the wireless base stations 77-79 nearby, continuously determines the signal intensity of the wireless signals, and continuously determines the positioning positions (coordinate values) of the user during movement. Then, the computer device 20 determines the predicted movement direction according to the determined positioning positions, and determines that the user will go to the lighting regions Z8, Z5 according to the predicted movement direction, and determines that the user will need the lighting of the lighting device 680-683, 656 in future.

Then, the computer device 20 connects to the wireless base station 78 and sends the lighting control signal to the wireless base station 78 for making the wireless base station 78 control the lighting device 680-683 to provide lighting, connects to the wireless base station 75 and sends the lighting control signal to the wireless base station 75 for making the wireless base station 75 control the lighting device 656 to provide lighting.

Then, as shown in FIG. 12B, during the user moving from the position P2 to the position P3, the computer device 20 continuously senses the wireless signals sent by the wireless base stations 75-79 nearby, continuously determines the signal intensity of the wireless signals, and continuously determines the positioning positions of the user during movement. Then, the computer device 20 determines the predicted movement direction according to the determined positioning positions, determines that the user will go to the lighting regions Z2 according to the predicted movement direction, and determines that the user will need not only the lighting of the lighting device 680-683,656, but also the lighting of the lighting device 652,623 in future.

Please be noted that although the lighting devices 620, 622,650,651 are respectively arranged in the lighting region Z5 which the user locates and the lighting region Z2 which the user will go to, the computer device 20 can know that turning on these lighting devices doesn't have ability of effectively providing the lighting because the lighting device 620,622,650,651 and the user are not located in the same aisle according to the aisle distribution information, and selectively not control to the lighting device 620, 622, 650, 651.

Besides, although the lighting devices 653-655,621 are respectively arranged in the lighting device Z5 which the user will go to and are in the same aisle with the current positioning position of the user, the computer device 20 can determine that the lighting devices 653-655,621 is too far away with the current positioning position of the user (namely, exceeding the default distance, such as 5 meters), and can't effectively provide the lighting even turning these lighting devices, and selectively do not control to the lighting device 635-655, 621.

Then, the computer device 20 connects to the wireless base station 75 and sends the lighting control signal to the wireless base station 75 for making the wireless base station 75 control the lighting device 652 to provide lighting, connects to the wireless base station 72 and sends the lighting control signal to the wireless base station 72 for making the wireless base station 72 control the lighting device 623 to provide lighting.

Then, as shown in FIG. 12C, during the user moving from the position P3 to the position P4, the computer device 20 continuously senses the wireless signals sent by the wireless base stations 71, 72, 74, 75, 76 nearby, continuously determines the signal intensity of the wireless signals, and continuously determines the positioning positions of the user during movement. Then, the computer device 20 determines the predicted movement direction according to the determined positioning positions, determines that the user will go to the lighting regions Z2 and may got to the lighting region Z1 according to the predicted movement direction, and determines that the user will need not only the lighting of the lighting devices 623, 652, 656, but also the lighting of the lighting devices 614, 622, 650, 651 in future.

Besides, the computer device 20 can further determine that the user will leave the lighting regions Z8, and determine that the user will not need the lighting of the lighting devices 680-683 in future.

Then, the computer device 20 connects to the wireless base station 71 and sends the lighting control signal to the wireless base station 71 for making the wireless base station 71 control the lighting device 614 to provide lighting, connects to the wireless base station 72 and sends the lighting control signal to the wireless base station 72 for making the wireless base station 72 control the lighting device 622 to provide lighting, connects to the wireless base station 75 and sends the lighting control signal to the wireless base station 75 for making the wireless base station 75 control the lighting device 650-651 to provide lighting. Besides, the computer device 20 connects to the wireless base station 78 and sends the lighting control signal to the wireless base station 78 for making the wireless base station 78 control the lighting device 614 to stop providing lighting.

Then, as shown in FIG. 12D, during the user moving from the position P4 to the position P5, the computer device 20 continuously senses the wireless signals sent by the wireless base stations 71, 72, 75 nearby, continuously determines the signal intensity of the wireless signals, and continuously determines the positioning positions of the user during movement. Then, the computer device 20 determines the predicted movement direction according to the determined positioning positions, and determines that the user will enter to the meeting room comprising the lighting regions Z1, Z2 and Z5 according to the predicted movement direction, and determines that the user will need not only the lighting of the lighting devices 614, 622, 650-651, but also the lighting of the lighting devices 610-613, 615, 620 in future.

Besides, the computer device 20 can further determine that the user will not need the lighting of the meeting room outside, and determine that the user will not need the lighting of the lighting devices 623, 652, 656 in future.

Then, the computer device 20 connects to the wireless base station 71 and sends the lighting control signal to the wireless base station 71 for making the wireless base station 71 control the lighting devices 610-613, 615 to provide lighting, connects to the wireless base station 72 and sends the lighting control signal to the wireless base station 72 for making the wireless base station 72 control the lighting device 620 to provide lighting. Besides, the computer device 20 connects to the wireless base station 72 and sends the lighting control signal to the wireless base station 72 for making the wireless base station 72 control the lighting devices 623 to stop providing lighting, connects to the wireless base station 75 and sends the lighting control signal to the wireless base station 75 for making the wireless base station 75 control the lighting devices 652, 656 to stop providing lighting.

Then, as shown in FIG. 12E, during the user continuously staying at the position P5, the computer device 20 continuously senses the wireless signals sent by the wireless base stations 71, 72, 75 nearby, continuously determines the signal intensity of the wireless signals, and continuously determines the positioning positions of the user (in this moment, the user is in a static status, or only moves slightly). Then, the computer device 20 determines the predicted movement direction according to the determined positioning positions, and determines that the user will stay in the lighting regions Z1 according to the predicted movement direction, and determines that the user will not need not the lighting of the lighting devices 614-615, 622, 650-651 which are far with the user in future.

Then, the computer device 20 connects to the wireless base station 71 and sends the lighting control signal to the wireless base station 71 for making the wireless base station 71 control the lighting devices 614-615 to stop providing lighting, connects to the wireless base station 72 and sends the lighting control signal to the wireless base station 72 for making the wireless base station 72 control the lighting devices 650-651 to stop providing lighting.

Thus, the present disclosed can control the lighting device real-time, provide the user the adequate lighting, and achieve the best effect of saving energy.

The above mentioned are only preferred specific examples in the present disclosed example, and are not thence restrictive to the scope of claims of the disclosed examples. Therefore, those who apply equivalent changes incorporating contents from the present disclosed examples are included in the scope of this application, as stated herein.

What is claimed is:

1. A real-time lighting control system, comprising:
    a plurality of lighting devices arranged in a plurality of lighting regions respectively in an indoor space;
    at least three wireless base stations arranged in the lighting regions respectively, each wireless base station being connected to the corresponding lighting device arranged in the corresponding lighting region, sending a wireless signal continuously, and controlling the connected lighting device when receiving a lighting control signal; and
    a computer device comprising:
    a positioning module continuously sensing the at least three wireless signals and dynamically determining a plurality of positioning positions corresponding to different time points according to at least three signal intensities of the at least three wireless signals and at least three of arranged positions of the at least three wireless base stations sending the at least three wireless signals; and
    a calculating module connected to the positioning module and selecting one of the lighting regions according to space information and the determined positioning positions, and sending the lighting control signal to the wireless base station arranged in the selected lighting region, wherein the space information records distributing information of the lighting regions in the indoor space.

2. The real-time lighting control system according to claim 1, wherein each wireless base station comprises:
    a low energy communicating module connected to the lighting device via a low energy communication protocol; and
    a network module sending the wireless signal continuously and connecting to the calculating module via a network communication protocol.

3. The real-time lighting control system according to claim 2, wherein the positioning module is a mobile device, the calculating module is a server, and the server is connected to the calculating module via the network communication protocol.

4. The real-time lighting control system according to claim 2, wherein the computer device is a mobile device.

5. The real-time lighting control system according to claim 1, wherein the calculating module is to determine a predicted movement direction according to the distributing information of the lighting regions in the indoor space and the determined positioning position, selecting the lighting region gradually approaching according to the predicted movement direction, and sending the lighting control signal to the wireless base station arranged in the lighting region gradually approaching.

6. The real-time lighting control system according to claim 5, wherein the calculating module selects the lighting region gradually leaving according to the predicted movement direction, and sends the lighting control signal to the wireless base station arranged in the lighting region gradually leaving.

7. The real-time lighting control system according to claim 6, wherein the space information further recodes information of connecting relationship of the at least three wireless base stations and the lighting devices, an arranged position of each lighting device and aisle distribution information of the indoor space.

8. The real-time lighting control system according to claim 7, wherein the calculating module selects one of the lighting devices arranged in the selected lighting region according to the aisle distribution information; recognizing the wireless base station connected to the selected lighting device according to the information of connecting relationship, and sending the lighting control signal to the recognized wireless base station.

9. The real-time lighting control system according to claim 6, wherein the calculating module is to determine the predicted movement direction via the Particle Swarm Optimization algorithm according to the distributing information of the lighting regions in the indoor space and the determined positioning positions.

10. The real-time lighting control system according to claim 6, wherein the calculating module is to calculate a steering angle or an acceleration of the positioning module according to the determined positioning positions, and determines the predicted movement direction according to the steering angle or the acceleration.

11. The real-time lighting control system according to claim 5, wherein the calculating module calculates a predicted movement scope, selecting one of the lighting regions according to an overlapping ratio of each lighting region overlapping the predicted movement scope.

12. A real-time lighting control method applying to a real-time lighting control system, the real-time lighting control system comprising a plurality of lighting devices arranged in a plurality of lighting regions in an indoor space, at least three wireless base stations arranged in the lighting regions and a computer device, the real-time lighting control method comprising:
  a) the computer device sensing at least three wireless signals sent from the wireless base stations continuously;
  b) dynamically determining a plurality of positioning positions corresponding to the different time points according to the at least three wireless signals and at least three arranged positions of the at least three wireless base stations sending the at least three wireless signals;
  c) selecting one of the lighting regions according to a space information and the determined positioning positions, wherein the space information records a distributing information of the lighting regions in the indoor space; and
  d) sending a lighting control signal to the wireless base station arranged in the selected lighting region for controlling the lighting device connected to the wireless base station.

13. The real-time lighting control method according to claim 12, wherein the step c comprises:
  c1) determining a predicted movement direction according to the distributing information of the lighting regions in the indoor space and the determined positioning position; and
  c2) selecting the lighting region gradually approaching according to the predicted movement direction.

14. The real-time lighting control method according to claim 13, wherein the step d comprises a step d1) sending the lighting control signal to the wireless base station arranged in the lighting region gradually approaching.

15. The real-time lighting control method according to claim 14, wherein the step c further comprises a step c3) selecting the lighting region gradually leaving according to the predicted movement direction.

16. The real-time lighting control method according to claim 15, wherein the step d comprises a step d2) sending the lighting control signal to the wireless base station arranged in the lighting region gradually leaving.

17. The real-time lighting control method according to claim 14, wherein the step d1 comprises:
  d11) selecting one of the lighting devices arranged in the selected lighting region according to aisle distribution information and an arranged position of each lighting device; and
  d12) recognizing the wireless base station connected to the selected lighting device according to information of connecting relationship of the at least three wireless base stations and the lighting devices, and sending the lighting control signal to the recognized wireless base station.

18. The real-time lighting control method according to claim 14, wherein the step c2 is to calculate a predicted movement scope, selecting one of the lighting regions according to an overlapping ratio of each lighting region overlapping the predicted movement scope.

* * * * *